A. L. JENSEN & B. S. HOXIE.
RIM BREAKER.
APPLICATION FILED MAY 23, 1917.
1,263,420.
Patented Apr. 23, 1918.
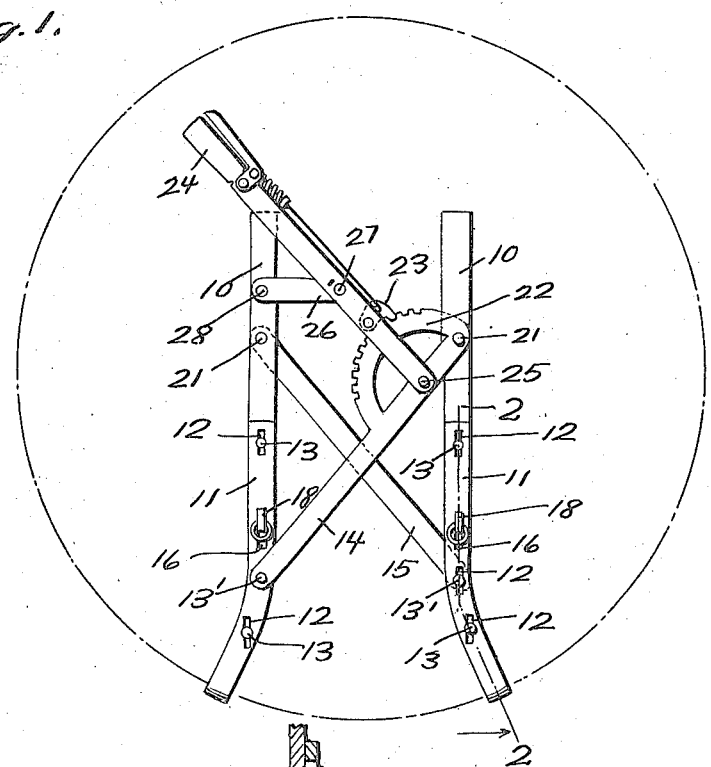
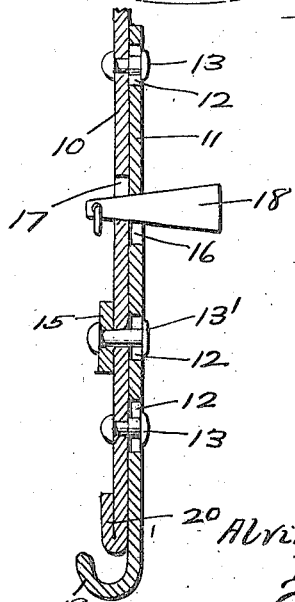
WITNESSES
INVENTOR
Alvin L. Jensen and
Bert S. Hoxie,
BY
ATTORNEY

UNITED STATES PATENT OFFICE.

ALVIN L. JENSEN AND BERT S. HOXIE, OF SPRING GREEN, WISCONSIN.

RIM-BREAKER.

1,263,420.  Specification of Letters Patent.  Patented Apr. 23, 1918.

Application filed May 23, 1917. Serial No. 170,506.

*To all whom it may concern:*

Be it known that we, ALVIN L. JENSEN and BERT S. HOXIE, citizens of the United States, residing at Spring Green, in the county of Sauk and State of Wisconsin, have invented certain new and useful Improvements in Rim-Breakers, of which the following is a specification.

This invention relates to an improved clamp for use in connection with the demountable rim of an automobile wheel and the principal object of the invention is to provide a rim breaker having improved rim engaging jaws and improved means for moving the side sections of the rim breaker toward or away from each other and releasably holding them in the adjusted position.

Another object of the invention is to provide a rim breaker so constructed that when operated, the side sections will move in the proper direction for removing the demountable rim or putting the same in place.

Another object of the invention is to provide an improved rim breaker which may be cheaply constructed and which while being simple in construction and easy to assemble, will be very strong and durable and not liable to easily break.

This invention is illustrated in the accompanying drawings, wherein:—

Figure 1 is a view showing the improved rim breaker in elevation and in position for use, and Fig. 2 is a sectional view taken along the line 2—2 of Fig. 1.

The rim breaker is provided with two side sections each of which is provided with its main section or jaw 10 and its auxiliary section or jaw 11, the auxiliary jaws being provided with slots 12 through which pass rivets 13 and 13′, the rivets being carried by the main sections 10 and the rivets 13 simply serving to connect the auxiliary sections with the main sections whereas the rivets 13′ serve to pivotally secure the lower ends of the straps 14 and 15. Slots 16 and 17 are formed in the two sections 10 and 11 of each of the side sections to receive the wedges 18 by means of which the auxiliary sections 11 will be moved to bring the hooked end portions 19 thereof toward the doubled end portions 20 of the main sections 10. From an inspection of Fig. 2 it will be readily seen that when the wedge is driven tightly into place, the demountable rim will be firmly gripped and the clamp prevented from slipping out of place thereon.

The straps or cross bars 14 and 15 have their upper ends pivotally connected with the main sections 10 of the side sections by rivets 21 and one of these connecting arms or links will be provided with a rack extension 22 for engagement by the pawl or latch 23 of the latch lever 24, the lower end of which is pivotally connected with the cross bar 14 by rivet or other fastener 25. A link 26 is connected with the intermediate portion of this latch lever by rivet 27 and has its outer end connected with the upper end portion of the main section 10 of one of the side members by the rivet or other pivotal fastener 28. It will thus be seen that when the latch lever is moved to spread the side sections or draw them together, the upper end portions of the two side sections will move toward each other while the lower end portions are moving away from each other. In other words, the upper end portions of the side sections will move in an opposite direction to the lower end portions.

When in use, the rim breaker will be put in place and the wedges 18 will be driven tightly into place thus drawing the hooked end portions of the auxiliary jaws 11 toward the lower end portions of the main jaws. The demountable rim will thus be tightly gripped by the side sections of the clamp. After the rim breaker has been tightly connected with the demountable rim, the latch lever 24 will be rocked to either spread or draw the lower end portions of the two side sections toward each other thus permitting the demountable rim to be easily put in place or removed.

What is claimed is:—

A rim breaker comprising side sections having gripping jaws, diagonally extending cross bars extending between the side sections in crossed relation and having their end portions pivotally connected with the upper and lower end portions of the side sections, a lever pivotally connected with the upper portion of one of the cross bars between the side sections, and a link having its inner end portion pivotally connected with the lever at a point intermediate the length of the lever and having its outer end portion pivotally connected with one of the side sections.

In testimony whereof we affix our signatures in presence of two witnesses.

ALVIN L. JENSEN.
BERT S. HOXIE.

Witnesses:
H. L. GRAY,
IRMA C. HILL.

Copies of this patent may be obtained for five cents each, by addressing the "Commissioner of Patents, Washington, D. C."